United States Patent [19]

Yen et al.

[11] Patent Number: 5,372,077
[45] Date of Patent: Dec. 13, 1994

[54] GARBAGE DISPOSAL SYSTEM

[76] Inventors: Chin-Ching Yen, No. 232, Sec. 2, Lu-Tsao Road, Lu-Kang, Chang Hua Hsien; Jen-Chieh Tai, No. 18-4 Alley 6, Lane 670, Da-Ya Road, Taichung City, both of Taiwan, Prov. of China

[21] Appl. No.: 186,040
[22] Filed: Jan. 25, 1994
[51] Int. Cl.$^5$ .............................. F23B 7/00
[52] U.S. Cl. .......................... 110/233; 110/204; 110/215; 110/219; 110/221; 110/222; 110/235; 110/346
[58] Field of Search ............... 110/233, 235, 346, 221, 110/222, 219, 204, 215, 224, 227

[56] References Cited

U.S. PATENT DOCUMENTS

| | | | |
|---|---|---|---|
| 3,622,508 | 11/1971 | Komline | 110/221 X |
| 3,938,449 | 2/1976 | Frisz et al. | 110/222 X |
| 4,665,841 | 5/1987 | Kish | 110/235 X |
| 4,682,548 | 7/1987 | Peng | 110/222 |

*Primary Examiner*—Edward G. Favors
*Attorney, Agent, or Firm*—Morton J. Rosenberg; David I. Klein

[57] ABSTRACT

A garbage disposal system includes a garbage classifier unit, which consists of a cutting mechanism, a separation water trough, squeezers, and a blower separator, and is controlled to separate plastics and mineral from garbage; a garbage furnace controlled to burn garbage being delivered from the garbage classifier unit, a waste gas treatment unit controlled to treat exhaust gas from the garbage furnace, and a sewage treatment unit controlled to treat waste water from the garbage classifier unit and the waste gas treatment unit for a repeat use.

7 Claims, 5 Drawing Sheets

GARBAGE DISPOSAL SYSTEM

BACKGROUND OF THE INVENTION

The present invention relates to an economic garbage disposal system for disposing of garbage effectively.

Various methods are known and widely used in garbage disposal. These methods include burning, embedding, compost forming, etc. The most accepted garbage disposing method is to burn garbage. However, conventional garbage furnaces are still not satisfactory in function because they do not separate waste plastics and mineral from the garbage to be disposed of. According to statistics, family garbage contains about 15% of waste plastics, about 60% of water, and about 18% of non-flammable solid substances such as metals, glass, stones, etc. Burning waste plastics will produce toxic gas causing a secondary pollution. Furthermore, molten plastic will cover over the garbage causing the garbage not to be completely burnt out. Because family garbage contains about 60% of water, directly burning the garbage consumes much fuel. Therefore, the performance and service life of the garbage furnace are badly affected, and the disposal cost is greatly increased. Because family garbage contains much non-flammable solid substances, the size of the collection of ash left after burning may be as much as 40% the original volume of the garbage.

SUMMARY OF THE INVENTION

The present invention has been accomplished under the aforesaid circumstances. It is therefore one object of the present invention to provide a garbage disposal system which separates non-flammable matters and plastic materials from the garbage before burning. It is another object of the present invention to provide a garbage disposal system which is economic and durable in use. It is still another object of the present invention to provide a garbage disposal system which provides a high performance.

To achieve the aforesaid objects, there is provided a garbage disposal system which is generally comprised of a garbage classifier unit controlled to separate plastics and mineral from garbage, which consists of a cutting mechanism, a separation water trough, squeezers, and a blower separator, a garbage furnace controlled to burn garbage being delivered from the garbage classifier unit, a waste gas treatment unit controlled to treat exhaust gas from the garbage furnace, and a sewage treatment unit controlled to treat waste water from the garbage classifier unit and the waste gas treatment unit for a repeat use.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
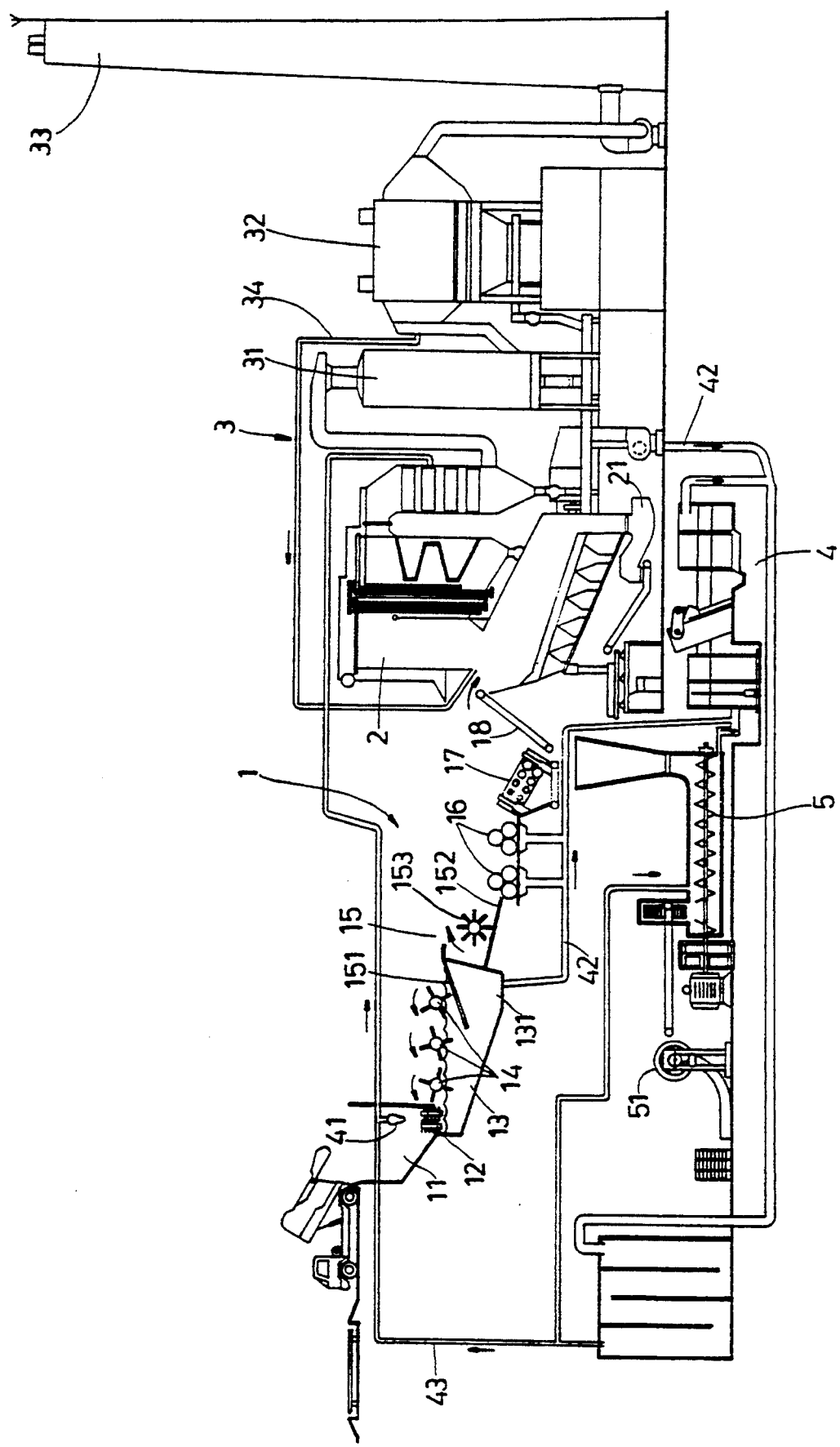
FIG. 1 is a plain view showing the layout of the garbage disposal system of the present invention.

Referring to the annexed drawings in detail and turning now first to FIG. 1, a garbage disposal system in accordance with the present invention is generally comprised of a classifier unit 1, a garbage furnace 2, a waste gas treatment unit 3, and a sewage treatment unit 4.

Figure 3:
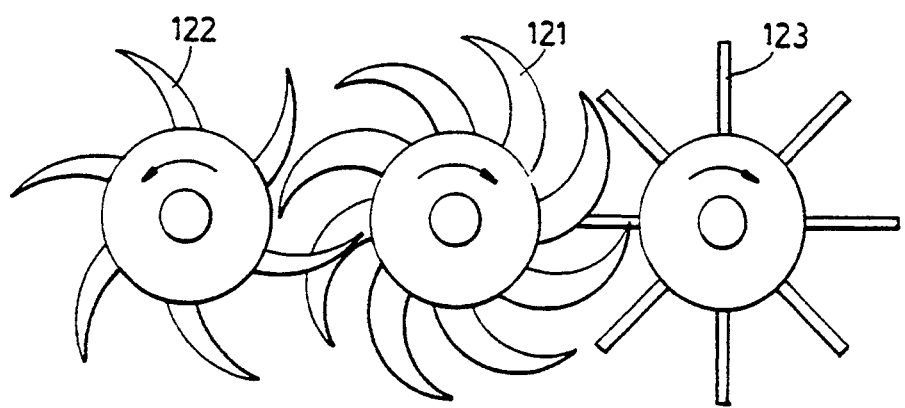
FIG. 3 is a top view of the cutting mechanism shown in FIG. 2.
Figure 2:
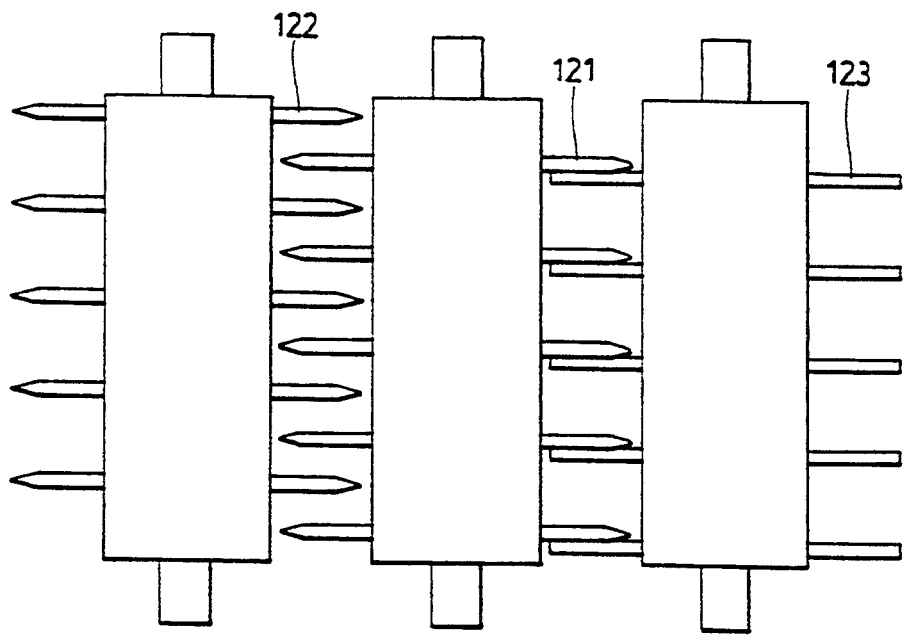
FIG. 2 is a side view of a cutting mechanism according to the present invention.

Referring to FIGS. 2 and 3 and FIG. 1 again, the classifier unit 1 comprises a cutting mechanism 12 disposed at the bottom outlet of the garbage gathering trough 11 thereof. The cutting mechanism 12 comprises two sets of cutter blades 121;122 alternatively arranged and turned in the reversed directions, and a set of rods 123 alternatively set behind the cutter blades 121 and turned in the same direction relative to the cutter blades 121. When plastic garbage bags are dumped in the garbage gather trough 11, they are cut by the cutter blades 121;122 causing the garbage dropped to a separation water trough 13, and at the same time, the empty plastic garbage bags are removed by the rods 123 and separately collected for further making reclaimed plastics.

Figure 4:
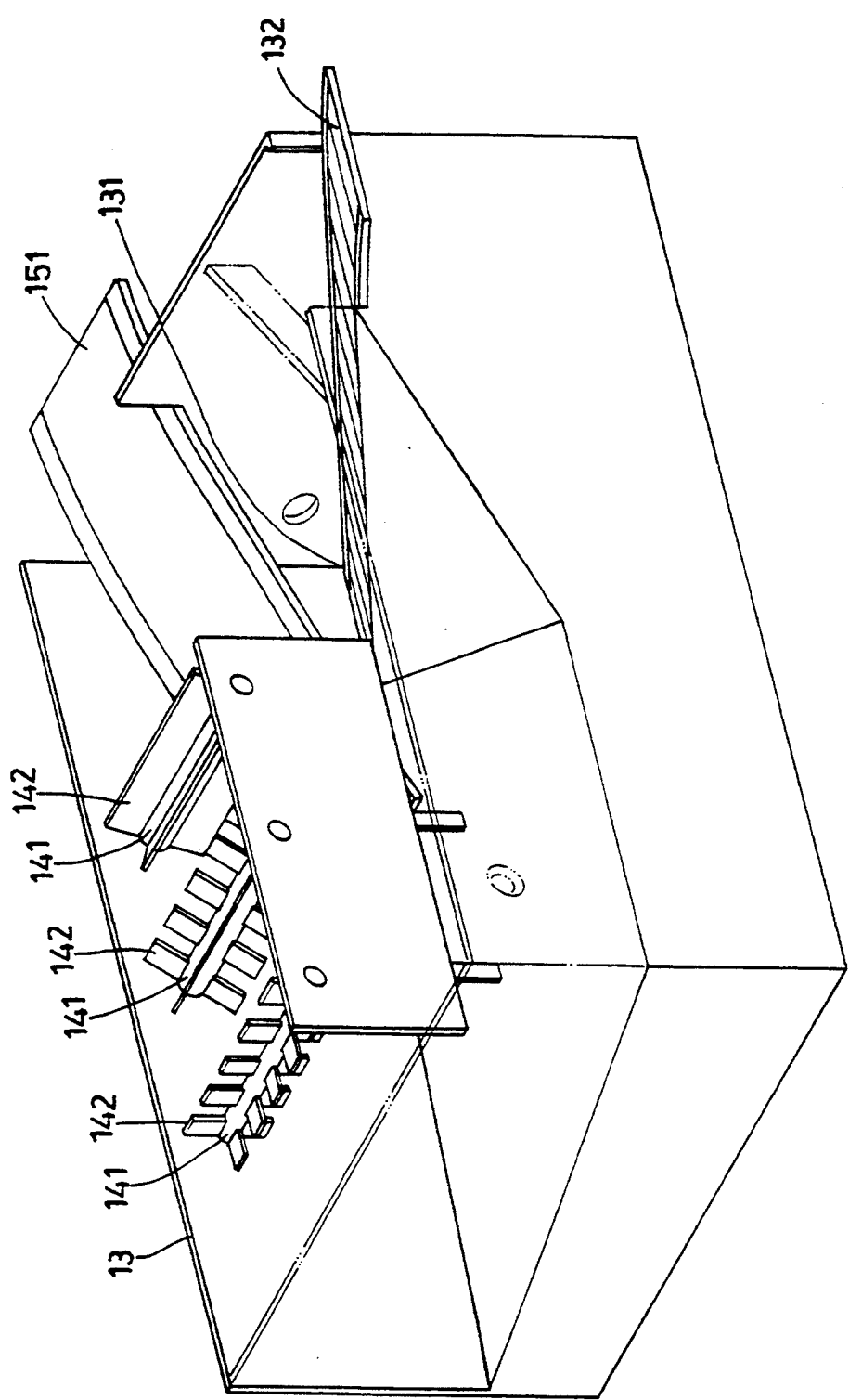
FIG. 4 is an elevational view of a separation water trough according to the present invention.
Figure 5:
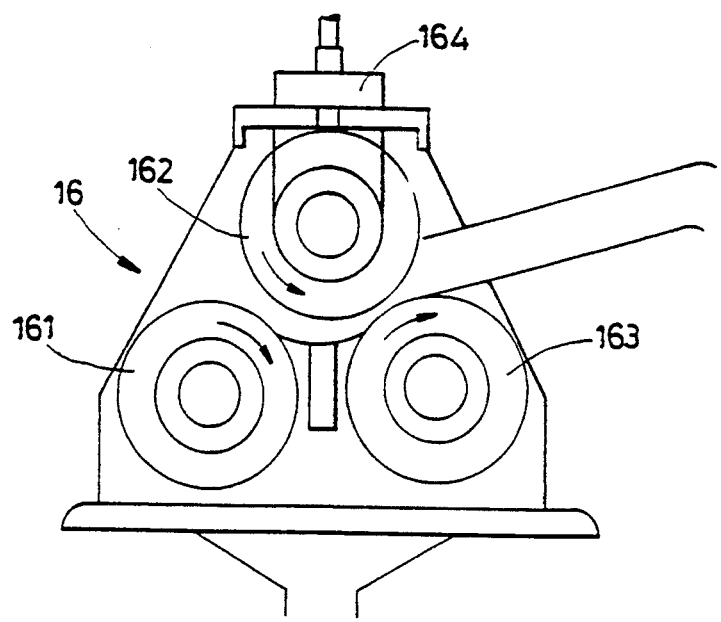
FIG. 5 is a side view of a squeezer according to the present invention.

The separation water trough 13, as shown in FIG. 4, comprises a sedimentation basin 131 where metals, stones, glasses, and other non-flammable things are settled to the bottom of a liquid contained in the sedimentation basin and then delivered away from the separation water trough 13 by a first conveyer system 132; things of low specific gravity are floated on the liquid. There are three parallel impellers 14 disposed on the surface of the liquid in the separation water trough 13, having each a revolving shaft 141 and a plurality of blades 142 around the respective revolving shaft 141. As the impellers 14 are turned, the floated garbage is propelled toward the rear side of the separation water trough 13 and then carried to squeezers 16 by a second conveyer system 15. While the floated garbage is propelled toward the rear side of the separation water trough 13, it is softened by the liquid in the separation water trough 13. The second conveyer system 15 comprises a meshed conveying belt 151 moved to carry the floated garbage out of the separation water trough 13, a solid conveying belt 152 moved to carry the gathered garbage from the meshed conveying belt 151 to each squeezer 16, and a rotary wheels 153 disposed above the solid conveying belt 152 and turned in the reversed direction relative to the solid conveying belt 152 to spread out the garbage being carried so as to control the garbage output to either squeezer 16.

The squeezer 16 comprises a hydraulic buffer mechanism 164 disposed at the top, and three rollers, namely, the first roller 161, the second roller 162, and the third roller 163 respectively disposed below the hydraulic buffer mechanism 164. The first and third rollers 161;163 are bilaterally disposed at the bottom. The second roller 162 is disposed between the hydraulic buffer mechanism 164 and the first and third rollers 161;163. The pitch between the first and second rollers 161;162 is longer than that between the second and third rollers 162;163 (because the garbage is delivered through the pitch between the first and second rollers 161;162 toward the pitch between the second and third rollers 162;163). When the collected garbage is delivered through the squeezer 16, water is squeezed away. The hydraulic buffer mechanism 164 protects the squeezer 16 when a hard object is crushed between the rollers 161;162;163.

Figure 7:
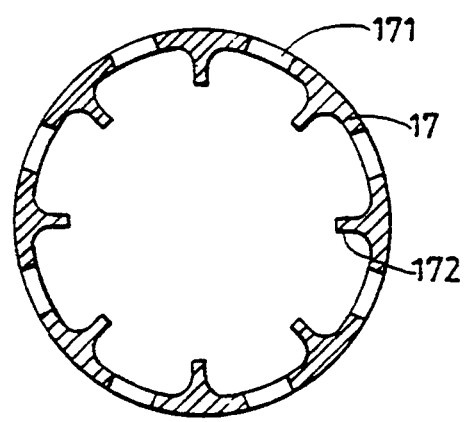
FIG. 7 is a sectional view taken along line VII—VII of FIG. 6.
Figure 6:
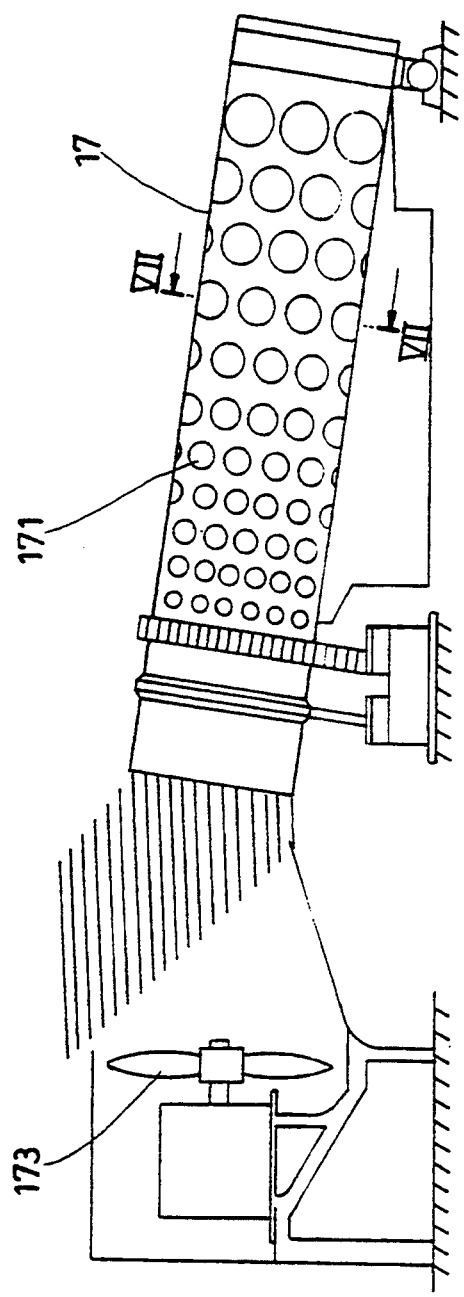
FIG. 6 is a side view of a blower separator according to the present invention.

The output of the squeezers 16 is connected to a blower separator 17. The blower separator 17, as shown in FIGS. 6 and 7, comprises a perforated cylinder 171 having a plurality of axial bumper ribs 172 spaced on the inside, and a blower 173 driven to send currents of air toward the inside of the perforated cylinder 171. The holes on the perforated cylinder 171 are made gradually bigger toward the rear end. The perforated cylinder 171 is disposed in a sloping position and turned to stir the garbage, permitting plastic films and sheets to be blown to a fixed location by the blower 173 for further collection. The other garbage separated from the blower separator 17 is then delivered by a third conveyer system 18 to a garbage furnace 2 for burning.

Referring to FIG. 1 again, the waste gas treatment unit 3 is mounted on the garbage furnace 2 at the top. The garbage furnace 2 has an ash outlet 21 at the bottom. The collection of garbage ash left after burning is collected and delivered to a collecting place.

The waste gas treatment unit 3 comprises a sprinkling filter 31, a dust collector 32 connected to the sprinkling filter 31, and a chimney 33 connected to the dust collector 32. The sprinkling filter 31 and the dust collector 32 are further linked by a waste gas return pipe 3 to the garbage furnace 2 for guiding waste gas to the garbage furnace. Because the temperature of the waste gas from the sprinkling filter 31 and the dust collector 32 is as high as about 200° C. it can be used to accelerate the burning of the garbage.

The classifier unit 1 further comprises a water sprayer device 41 disposed above the cutting mechanism 12 and controlled to spray water over the garbage being dumped in the gathering trough 11. Waste water from the gathering trough 11, the squeezers 16, the separation water trough 13, and the sprinkling filter 31 is guided by a waste water pipe 42 to the sewage treatment unit 4. The sewage treatment unit 4 has an output port connected to a water supply system by a return water pipe 43 for repeated use. The garbage furnace 2, the sprinkling filter 31, the dust collector 32, and the chimney 33 are of known devices, therefore they are not described herein in detail.

While only one embodiment of the present invention has been shown and described, it will be understood that various modifications and changes could be made without departing from the spirit and scope of the invention. For example, a washing machine 5 may be installed and controlled to wash the plastic garbage separated from the blower separator 17, and a compactor 51 may be installed and controlled to compact the plastic garbage being washed through the washing machine 5 for permitting the compacted plastic garbages to be collected for making reclaimed plastics.

What is claimed is:

1. A garbage disposal system comprising:
   a garbage classifier unit, said garbage classifier unit comprising a garbage gathering trough in which the garbage plastic bag packed garbage to be disposed of is dumped, a cutting mechanism disposed in said garbage gathering trough and controlled to cut open the garbage plastics bags being dumped in said garbage gathering trough, a separation water trough having a sedimentation basin for permitting garbage of high specific gravity to be settled to the bottom and garbage of low specific gravity to be moved on the surface of the water being contained in said separation water trough, squeezers controlled to squeeze water away from the garbage being delivered from said separation water trough, impellers disposed in said separation water trough and controlled to propel floated garbage from said separation water trough to said squeezers, a first conveyer controlled to carry sedimented garbage from said sedimentation basin to a collecting place, a second conveyer system controlled to carry garbage of low specific gravity being floated on said separation water trough to said squeezers, and a blower separator controlled to separate plastic films and sheets from crushed garbage obtained from said squeezers;
   a garbage furnace having an input port connected to said blower separator of said garbage classifier unit by a third conveyer system and an ash outlet at the bottom;
   a waste gas treatment unit connected to said garbage furnace at the top and controlled to treat waste gas from said garbage furnace, said waste gas treatment unit comprising a sprinkling filter controlled to remove solid substances from the output waste gas of said garbage furnace, a dust collector connected to said sprinkling filter to collect solid substances, a chimney connected to said dust collector for carrying smoke away from said dust collector, and a waste gas return pipe having one end connected to said garbage furnace and an opposite end connected to said sprinkling filter and said dust collector;
   a water supply system controlled to provide water to said separation water trough of said garbage classifier and said sprinkling filter of said waste gas treatment unit; and
   a sewage treatment unit having an input port connected to said garbage classifier and an output port connected to said water supply system.

2. The garbage disposal system of claim 1 wherein each impeller of said garbage classifier unit comprises a revolving shaft horizontally disposed in said separation water trough, and a plurality of blades mounted around said revolving shaft and turned by said revolving shaft to propel floating garbage in said separation water trough toward said second conveyer system.

3. The garbage disposal system of claim 1 further comprising a washing machine controlled to wash plastic garbage obtained from said blower separator, and a compactor controlled to compact plastic garbage obtained from said washing machine.

4. The garbage disposal system of claim 1 wherein said second conveyer system comprises a meshed conveying belt controlled to carry floating garbage out of said separation water trough.

5. The garbage disposal system of claim 1 wherein said cutting mechanism of said garbage classifier unit comprises a first set of cutter blades and a second set of cutter blades alternatively arranged and turned in reversed directions, and a set of rods alternatively arranged with said first set of cutter blades and turned in the same direction.

6. The garbage disposal system of claim 1 wherein each squeezer comprises a hydraulic buffer mechanism disposed at the top, a first roller and a second roller bilaterally disposed at the bottom, and a third roller disposed between said first and second rollers and said hydraulic buffer mechanism, the pitch between said first and second rollers being provided for input of garbage from said second conveyer system, the pitch between said second and third rollers being provided for output of squeezed garbage, the pitch between said first and second rollers being longer than that between said second and third rollers rollers.

7. The garbage disposal system of claim 1 wherein said blower separator comprises a perforated cylinder disposed in a sloping position and turned on a shaft thereof, and a blower controlled to blow currents of air through said perforated cylinder, said perforated cylinder comprising a plurality of holes spaced around the periphery thereof, and a plurality of axial bumper ribs spaced on the inside, the holes on the periphery of said perforated cylinder being arranged gradually bigger toward a rear end of said perforated cylinder.

* * * * *